US012434539B2

(12) United States Patent
Tong et al.

(10) Patent No.: US 12,434,539 B2
(45) Date of Patent: Oct. 7, 2025

(54) HEATER DEVICE (71) Applicant: VALEO AUTOMOTIVE AIR CONDITIONING HUBEI CO., LTD., Hubei (CN)

(72) Inventors: Ziran Tong, Hubei (CN); Qiang Geng, Hubei (CN)

(73) Assignee: VALEO AUTOMOTIVE AIR CONDITIONING HUBEI CO., LTD., Jingzhou (CN)

( * ) Notice: Subject to any disclaimer, the term of this patent is extended or adjusted under 35 U.S.C. 154(b) by 910 days.

(21) Appl. No.: 17/456,769

(22) Filed: Nov. 29, 2021

(65) Prior Publication Data
US 2022/0097485 A1 Mar. 31, 2022

Related U.S. Application Data (63) Continuation of application No. PCT/CN2020/093291, filed on May 29, 2020.

(30) Foreign Application Priority Data

May 31, 2019 (CN) .......................... 201910469573.1

(51) Int. Cl.
H05B 3/78 (2006.01)
B60H 1/22 (2006.01)
(Continued)

(52) U.S. Cl.
CPC .......... B60H 1/2225 (2013.01); B60H 1/2218 (2013.01); H05B 3/02 (2013.01);
(Continued)

(58) Field of Classification Search
CPC ...... H05B 2203/023; H05B 3/02; H05B 3/06; H01R 4/4846; H01R 12/00; H02M 3/003;
(Continued)

(56) References Cited

U.S. PATENT DOCUMENTS 2,367,170 A * 1/1945 Fahrenwald .......... F24H 3/0405
219/385
3,131,865 A * 5/1964 Roe ....................... F24H 7/0416
165/104.31
(Continued)

FOREIGN PATENT DOCUMENTS

CN 106160430 A 11/2016
EP 1884383 A1 * 2/2008 .......... B60H 1/2225
(Continued)

OTHER PUBLICATIONS

Extended European Search Report issued in Corresponding EP Application No. 20 814 068.1, dated May 30, 2023. (7 Pages).
(Continued)

Primary Examiner — Jimmy Chou
(74) Attorney, Agent, or Firm — Osha Bergman Watanabe & Burton LLP (57) ABSTRACT A heater device for a vehicle is described. The heater device include a plurality of heating elements, a printed circuit board, a first bus-bar, and a second bus-bar. The first bus-bar having a first set of connecting legs is formed in a first side of the first bus-bar. The first set of connecting legs is adapted to be connected with a first set of heating elements amongst the plurality of heating elements. The second bus-bar having a coupling element is formed in a first side of the second bus-bar to couple with a first side of the PCB. Further, a second set of connecting legs is formed adjacent to the coupling element and adapted to be coupled to the first side of the PCB. The second set of connecting legs is adapted to connect with a second set of heating elements amongst the plurality of heating elements.

9 Claims, 7 Drawing Sheets (51) Int. Cl.
*H05B 3/02* (2006.01)
*H01R 12/55* (2011.01)
*H01R 24/66* (2011.01)
*H01R 101/00* (2006.01)

(52) U.S. Cl.
CPC .............. *H01R 12/55* (2013.01); *H01R 24/66* (2013.01); *H01R 2101/00* (2013.01); *H05B 2203/016* (2013.01); *H05B 2203/023* (2013.01)

(58) Field of Classification Search
CPC ....... H02M 7/003; H01M 50/507; F24H 3/00; F24H 3/04; F24H 3/06; F24H 3/08; F24H 3/10; B60H 1/22
See application file for complete search history.

(56) References Cited

U.S. PATENT DOCUMENTS

2013/0279114 A1* 10/2013 Nishikimi ............. B60L 15/007
  361/699
2017/0295613 A1* 10/2017 Kim ........................ H05B 3/22

FOREIGN PATENT DOCUMENTS

EP         2330865 A1 *  6/2011  ............... H05B 3/50
WO  WO-2018030607 A1 *  2/2018  ......... B60H 1/00392

OTHER PUBLICATIONS

The First Office Action issued in Chinese Application No. 201910469573.1, dated Jul. 22, 2022 (17 pages).

* cited by examiner

HEATER DEVICE

The present subject matter generally relates to a heater device, and in particular, to a bus-bar assembly of a heater device provided in a Heating Ventilation and Air conditioning (HVAC) system.

Generally, HVAC systems are provided in a vehicle to provide comfort driving to the driver and the occupants. The HVAC system may include heat exchangers to provide either hot air or cold air based on a mode of operation of the heat exchangers. To provide hot air to the cabin, hot fluid is received in the heat exchangers from an engine of the vehicle, in case the vehicle is an internal combustion engine vehicle. In case the vehicle is an electric vehicle or a hybrid vehicle, a heater core having heating elements is used to provide hot air to the cabin of the vehicle. The heating elements are electrical heating elements powered by an electrical source. In some case, the heater core is used to cold start the engine of the vehicle when the vehicle is in a cold region. If the heater core is utilized to provide comfort conditions to the passengers inside the vehicle's cabin, the heater core is placed in a downstream of an evaporator of the HVAC unit.

Figure 1A:
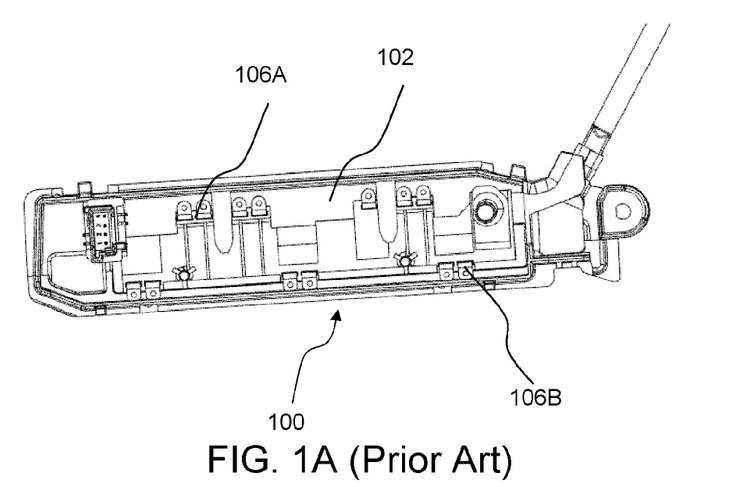
FIGS. 1A and 1B illustrate conventional bus-bar assemblies provided in respective housings of a heater device, in accordance with an embodiment of a prior art.

The heating elements are connected to a bus-bar assembly for providing electrical energy to the heating elements. The bus-bar assembly has a positive bus-bar and a negative bus-bar having corresponding connecting legs to connect with the corresponding heating elements. Conventionally, the connecting legs of the bus-bar assembly are provided in both sides of the bus-bar, which increases length of the power loop, therefore, thermal efficiency of the heater device is deteriorated. FIG. 1A shows a housing 100 of a heating device having a conventional bus-bar assembly 102. The conventional bus-bar assembly 100 may include positive connecting legs 106A provided on a side of the conventional bus-bar assembly 100, and negative connecting legs 106B provided opposite side of the conventional bus-bar assembly 100. As the positive connecting legs 106A and negative connecting legs 106B are in different side of the conventional bus-bar assembly 100, length of power loop is increases in the heater device, which affects thermal dissipation efficiency of the heater device.

Figure 1B:
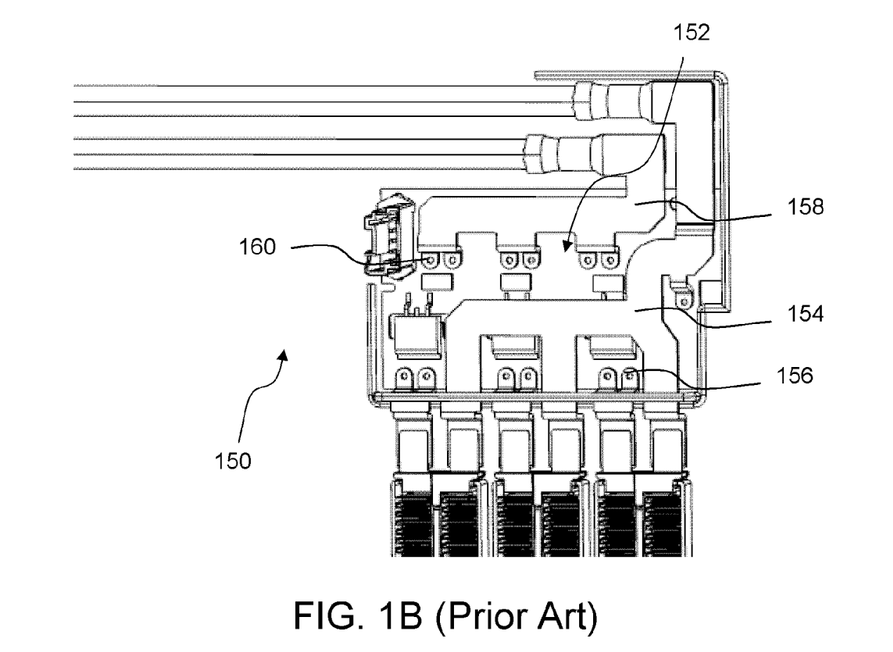

FIG. 1B shows another housing 150 having another conventional bus-bar assembly 152. The conventional bus-bar assembly 152 may include a positive bus-bar 154 having positive connecting legs 156, and a negative bus-bar 158 having negative connecting legs 160. The positive connecting legs 156 and the negative connecting legs 160 are provided in one side of the positive bus-bar 154 and the negative bus-bar 158 respectively. Although the positive connecting legs 156 and the negative connecting legs 160 are provided in one side of respective the positive bus-bar 154 and the negative bus-bar 158, length of power loop is increased in the heater device, since the negative bus-bar 158 is laterally spaced from the positive bus-bar 160.

As the length of the power loop is increasing, efficiency of the heater device is reduced. Further, the lengthy power loop will decrease thermal dissipation efficiency. As the legs of the bus-bar assembly are in both sides of the bus-bar assembly, size of a PCB board provided in the housing is increased, which causes cumbersome while packing the heater device in the HVAC unit.

Accordingly, there is need for a heater device having a bus-bar assembly that reduces length of power loop. Further, there is need for a bus-bar assembly that enhances thermal dissipation efficiency and avoids electrical leakage between two bus-bars.

In the present description, some elements or parameters may be indexed, such as a first element and a second element. In this case, unless stated otherwise, this indexation is only meant to differentiate and name elements which are similar but not identical. No idea of priority should be inferred from such indexation, as these terms may be switched without betraying the invention. Additionally, this indexation does not imply any order in mounting or use of the elements of the invention.

In view of the foregoing, an embodiment of the invention herein provides a heater device for a vehicle. The heater device includes a plurality of heating elements, a printed circuit board, a first bus-bar, and a second bus-bar. The first bus-bar having a first set of connecting legs that is formed in a first side of the first bus-bar. The first set of connecting legs is adapted to be connected with a first set of heating elements amongst the plurality of heating elements. The second bus-bar having a coupling element that is formed in a first side of the second bus-bar to couple with a first side of the printed circuit board. Further, a second set of connecting legs is formed adjacent to the coupling element and adapted to be coupled to the first side of the printed circuit board. The second set of connecting legs is adapted to connect with a second set of heating elements amongst the plurality of heating elements.

In one embodiment, the heater device includes a housing that is adapted to encapsulate the printed circuit board, the first bus-bar, and the second bus-bar.

In another embodiment, the heater device includes a control circuit provided on the printed circuit board and in-proximity to the coupling element and the second set of connecting legs for controlling the plurality of heating elements. The second bus-bar is connected to the second set of connecting legs through the control circuit for controlling the plurality of heating elements. Further, the control circuit may include a switching element to power-on and power-off the plurality of heating elements.

Generally, the second bus-bar is spaced apart from and superposed to the first bus-bar.

In one embodiment, the heater device further includes a first terminal provided in a second side of the first bus-bar and a second terminal provided in a side perpendicular to the first side of the second bus-bar for providing electrical energy to the plurality of heating elements.

According to another aspect of the invention, a bus-bar assembly for a heater device is provided. The bus-bar assembly include a first bus-bar and a second bus-bar. The first bus-bar having a first set of connecting legs that is formed in a first side of the first bus-bar. The first set of connecting legs is adapted to be connected with a first set of heating elements. The second bus-bar having a coupling element that is formed in a first side of the second bus-bar to couple with a first side of a printed circuit board received therein. Further, a second set of connecting legs is formed adjacent to the coupling element and adapted to be coupled to the first side of the printed circuit board. The second set of connecting legs is adapted to connect with a second set of heating elements.

In one embodiment, the first set of connecting legs is formed below the first side of the printed circuit board.

In another embodiment, the heater device includes a control circuit provided on the printed circuit board and in-proximity to the coupling element and the second set of connecting legs for controlling the first set of heating elements and the second set of heating elements.

Further, the second bus-bar is connected to the second set of connecting legs through the control circuit for controlling the first set of heating elements and the second set of heating elements.

In another embodiment, the second bus-bar is spaced apart from and superposed to the first bus-bar.

Other characteristics, details and advantages of the invention can be inferred from the description of the invention hereunder. A more complete appreciation of the invention and many of the attendant advantages thereof will be readily obtained as the same becomes better understood by reference to the following detailed description when considered in connection with the accompanying figures, wherein:

It must be noted that the figures disclose the invention in a detailed enough way to be implemented, the figures helping to better define the invention if needs be. The invention should however not be limited to the embodiment disclosed in the description.

The present subject matter relates to concepts relating to a heater device having a bus-bar assembly with shorten power loop to increase thermal dissipate efficiency. Generally, the heater device is provided in a Heating Ventilation Air Conditioning system of an electrical vehicle to provide hot air to the vehicle's cabin. Further, the heater device can be used to warm-up an engine of a vehicle during cold start of the vehicle. The heater device may include a first bus-bar and a second bus-bar layered on the first bus-bar at a distance. In other words, the second bus-bar is laterally spaced apart from the first bus-bar. The first bus-bar having a first set of connecting legs formed in a first side of the first bus-bar, and the second bus-bar having a coupling element formed in a first side of the second bus-bar. The coupling element forms a connection with the a second set of connecting legs through a printed circuit board, and the second set of connecting legs formed adjacent to the coupling element. As the second set of connecting legs formed adjacent to the coupling element, the second set of connecting legs lies in the first side of the second bus-bar. The first set of connecting legs and the second set of connecting legs are adapted to be connected with corresponding heating elements of the heater device. As the first set of connecting legs and the second set of connecting legs are formed in one side of the first bus-bar and the second bus-bar, length of power loop is reduced, thereby thermal dissipation efficiency of the heater device is enhanced.

These and other advantages of the present subject matter would be described in greater detail in conjunction with the following figures. While aspects relating to a bus-bar assembly provided in a heating device as described above and henceforth can be implemented in any number of connecting legs which are provided in one side of the bus-bar assembly to avoid lengthy power loop, the embodiments are described in the context of the following system(s).

Figure 2A:
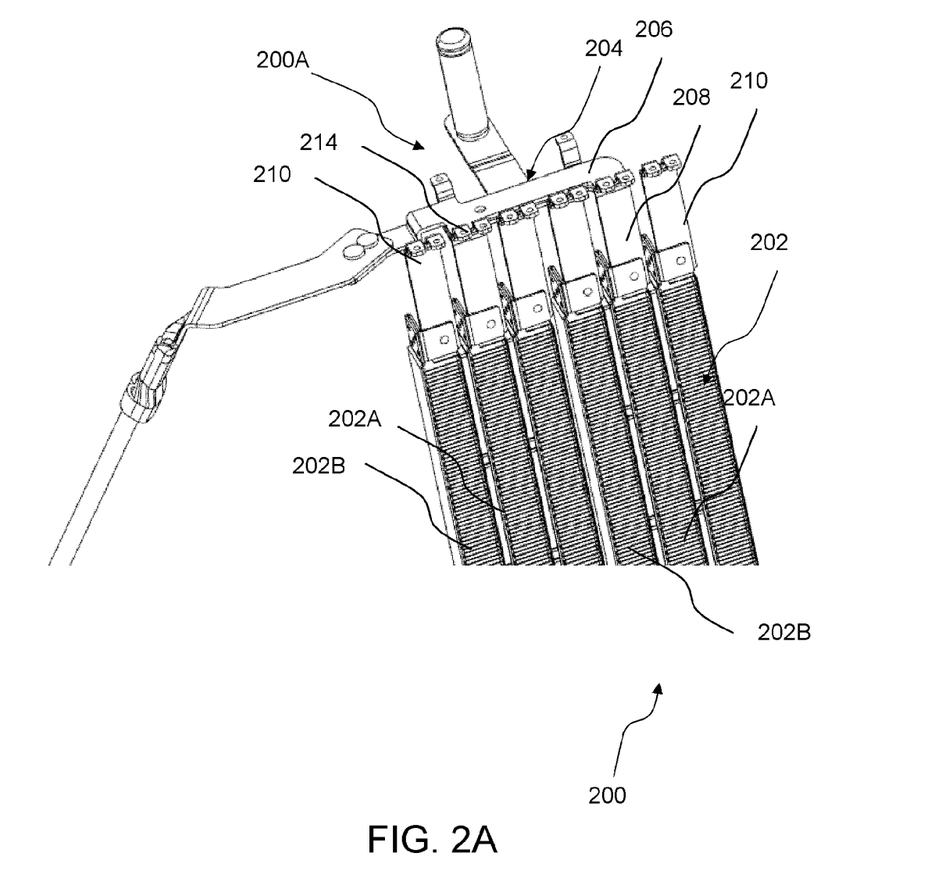
FIG. 2A is a perspective view of a heater device, in accordance with an embodiment of the present invention.
Figure 2B:
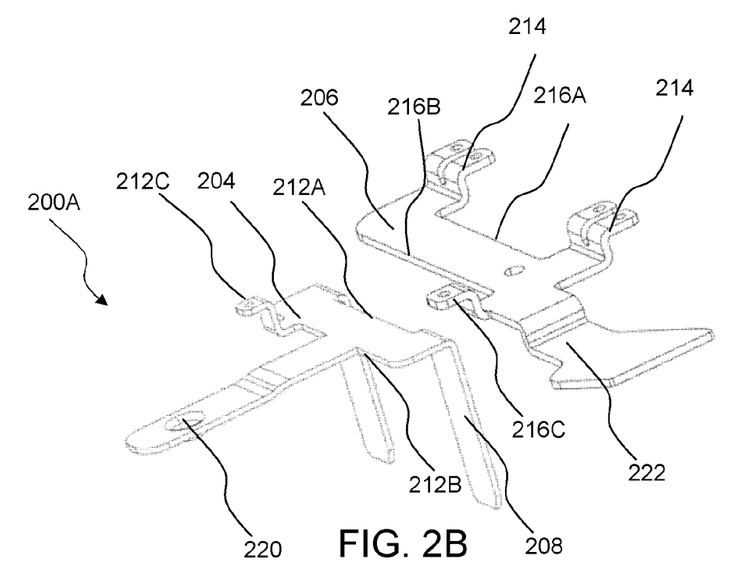
FIG. 2B is an exploded view of a bus-bar assembly of the heater device, in accordance with an embodiment of the present invention.

FIGS. 2A and 2B illustrate different views of a heater device 200 having a bus-bar assembly 200A, in accordance with an embodiment of the present invention. In one example, FIG. 2A is a perspective view of a heater device 200, and FIG. 2B is an exploded view of the bus-bar assembly 200A. The heater device 200 includes a plurality of heating elements 202, a first bus-bar 204, and a second bus-bar 206. The first bus-bar 204, and the second bus-bar 206 are collectively referred to as the bus-bar assembly 200A. The first bus-bar 204 having a first set of connecting legs 208 that is formed in a first side 212A of the first bus-bar 204. The second bus-bar 206 having a coupling element 214 that is formed on a first side 216A of the second bus-bar 206 and adapted to be coupled to a first side of a printed circuit board (PCB) (not shown in FIGS. 2A and 2B). The heater device 200 further includes a second set of connecting legs 210 provided parallel to the first set of connecting legs 208 and coupled to the first side of the PCB. Further, the second set of connecting legs 210 is coupled to the first side of the PCB in such a way that the second set of connecting legs 210 is attached to the PCB adjacent to the coupling element 214. In other words, one end of the second set of connecting legs 210 is connected to the PCB at a position adjacent to the coupling element 214. Further, the first set of connecting legs 208 is adapted to be connected with a first set of heating elements 202A amongst the plurality of heating elements 202. Furthermore, another end of the second set of connecting legs 210 is adapted to be connected with a second set of heating elements 202B amongst the plurality of heating elements 202. The second set of connecting legs 210 is connected to the coupling element 214 through a control circuit (not shown in FIG.) to control the plurality of the heating elements 202.

In one embodiment, the first bus-bar 204 is a negative bus-bar and the second bus-bar 206 is a positive bus-bar. In another embodiment, the first set of connecting legs 208 is formed in such a way that the first set of connecting legs 208 is perpendicular to the first bus-bar 204. In other words, the first set of connecting legs 208 is extended perpendicularly from the first bus-bar 204. In yet another embodiment, the second set of connecting legs 210 is perpendicular to the second bus-bar 206. Further, the second bus-bar 206 is spaced apart from and superposed to the first bus-bar 204. The bus-bar assembly 200A further includes a first terminal 220 and a second terminal 222 to provide electrical energy to the plurality of heating elements 202 through the first set of connecting legs 208 and the second set of connecting legs 210. In one embodiment, the first terminal 220 is formed on the second side 212B of the first bus-bar 204, the second terminal 222 is formed on a side perpendicular to the first side 216A of the second bus-bar 206. In other words, the second terminal 222 is provided on a side formed between the first side 216A and the second side 216B of the second bus-bar 206. In one embodiment, the first terminal 220 is a negative terminal providing negative connection to the first set of heating elements 202A and the second terminal 222 is a positive terminal providing positive connection to the second set of heating elements 202B. In another embodiment, the first terminal 220 can be the positive terminal and the second terminal 222 can be the negative terminal.

Figure 3A:
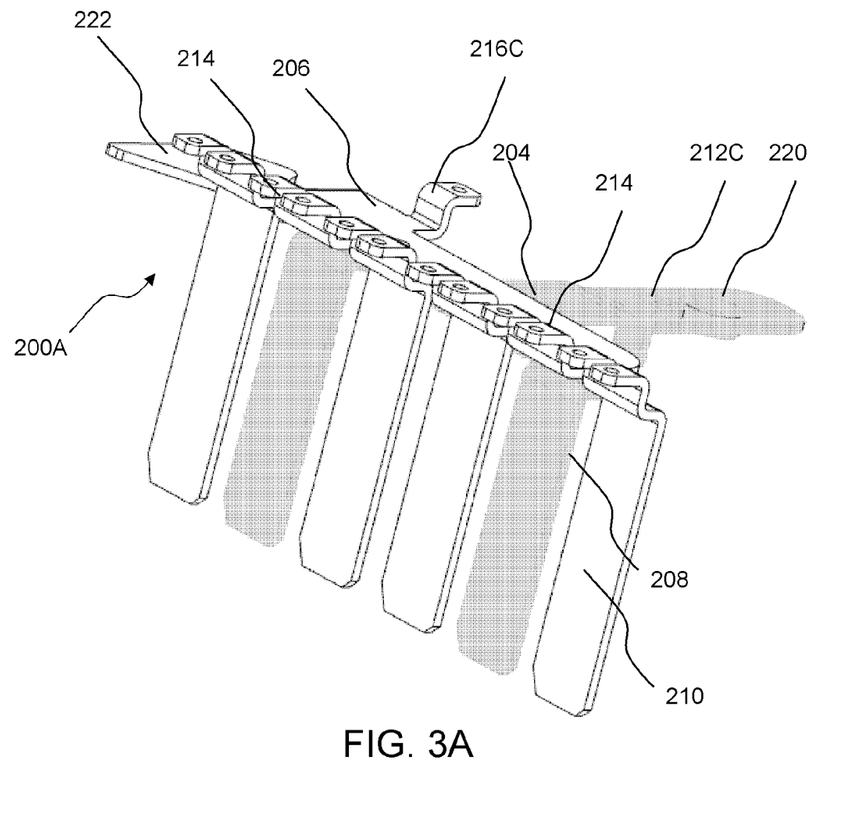
FIGS. 3A and 3B illustrate a perspective view of the bus-bar assembly of FIG. 2A.
Figure 3B:
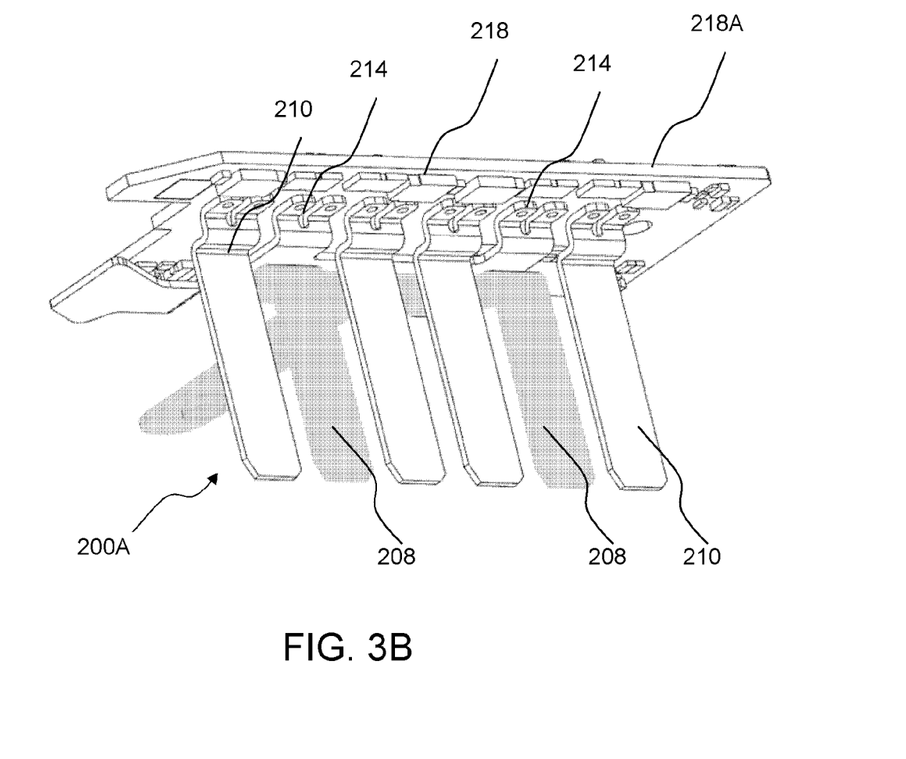

FIG. 3A illustrates a perspective view of the bus-bar assembly 200A and FIG. 3B illustrates the bus-bar assembly 200A having the PCB 218 therein. The PCB is provided over the bus-bar assembly 200A to control the plurality of heating elements 202. Further, a first supporting element 212C is provided on the second side 212B of the first bus-bar 204, and a second supporting element 216C is provided on the second side 216B of the second bus-bar 206. The first supporting element 212C and the second supporting element 216C are adapted to be coupled to the PCB 218 to provide rigid support to the bus-bar assembly 200A. The second set of connecting legs 210 and the coupling element 214 of the second bus-bar 206 is coupled to the bottom first side 218A of the PCB 218 as shown in FIG. 3B. When the heater device 200 is energized by providing electrical energy to the first terminal 220 and the second terminal 222, the power supply circuit is closed through the plurality of heating elements 202 and heat is generated therein. Based on the control circuit settings, the heat generated by the heating element 202 is controlled. As the bus-bar assembly 200A having the both first set of connecting legs 208 and the second set of connecting legs 210 in single side, length of power loop is reduced, thereby the thermal efficiency of the heater device 200 is enhanced.

Figure 4A:
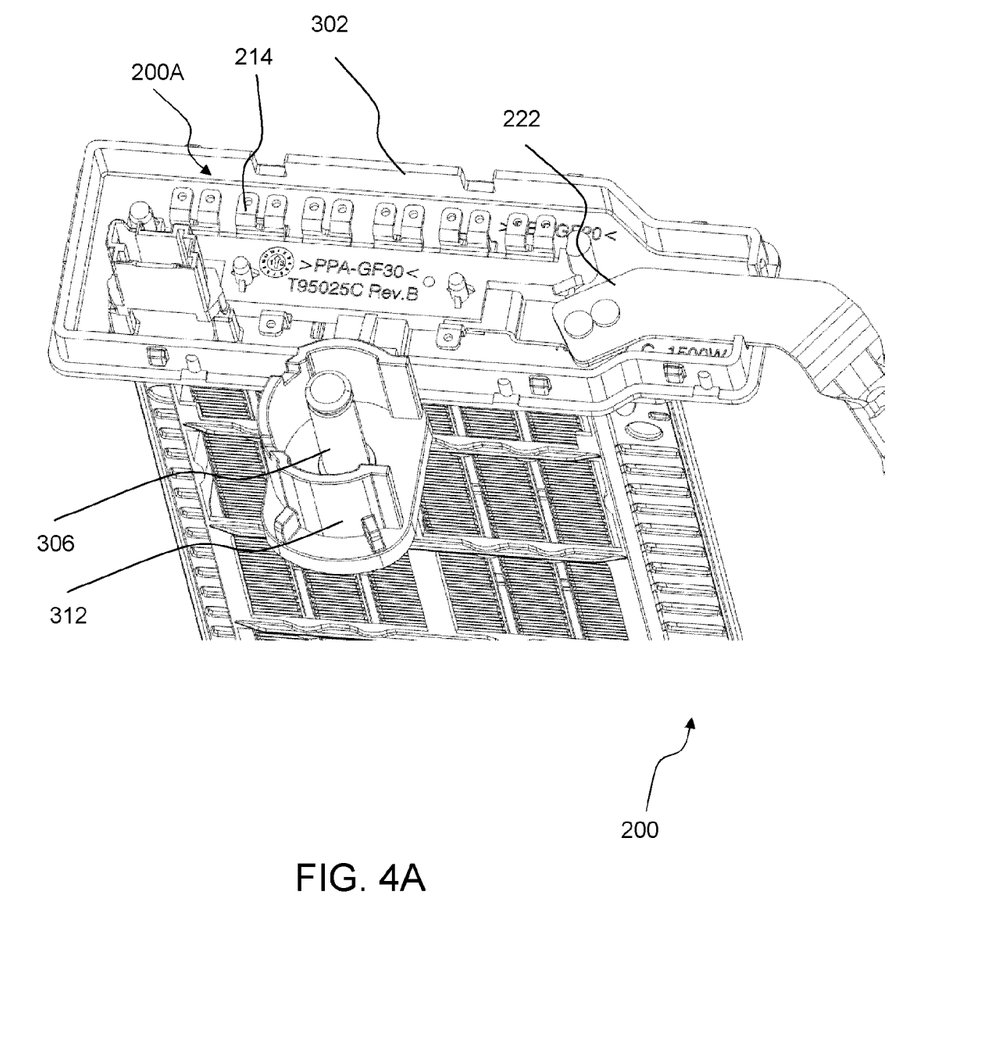
FIG. 4A shows the bus-bar assembly provided in a housing of the heater device of FIG. 2A.
Figure 4B:
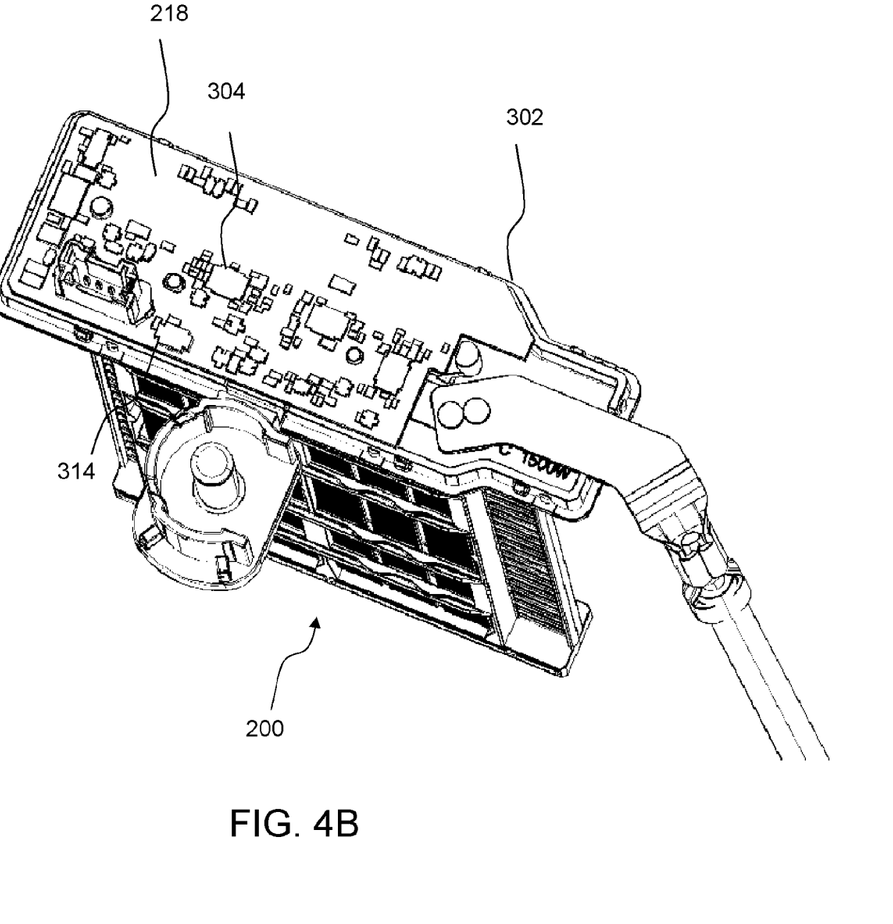
FIG. 4B shows a Printed Circuit Board provided on the housing of the heater device of the FIG. 2A.
Figure 4C:
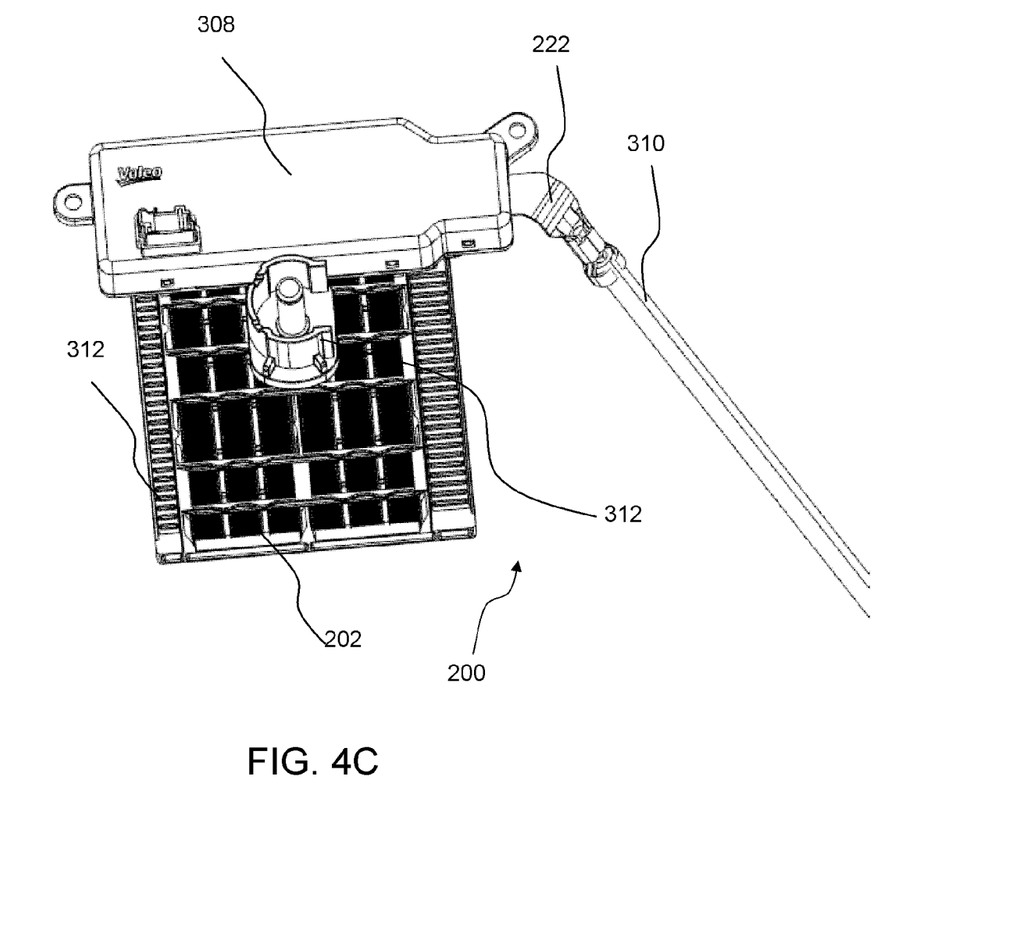
FIG. 4C shows an assembled view of the heater device.

FIGS. 4A, 4B and 4C are perspective view of the heater device 200 connected to the electrical energy of FIG. 3B. The heater device further comprises a housing 302 adapted to encapsulate the PCB 218, the first bus-bar 204 and the second bus-bar 206. In one example, FIG. 4A shows the bus-bar assembly 200A provided in the housing 302 of the heater device 200, and FIG. 4B shows the PCB 218 provided on the housing 302 of the heater device 200. The control circuit 304 is provided on the PCB 218 and in-proximity to the coupling element 214 and the second set of connecting legs 210 for controlling the plurality of heating elements 202. The control circuit 304 may include a switching element 314 to power-on and power-off the plurality of heating elements 202.

The housing 302 is adapted to provide electrical insulation to the PCB 218 and the bus-bar assembly 200A from other elements provided in the HVAC system. Further, the control circuit 304 is provided on the PCB 218 and adapted to connect the coupling element 214 with the second set of connecting legs 210. The housing 302 further includes a connecting pin 306 coupled to the first terminal 220 of the first bus-bar 204. The connecting pin 306 is adapted to be coupled to a connector of the electrical energy source, and is perpendicular to the first terminal 220 to receive the connector of the electrical energy source. Further, the connecting pin 306 is encapsulated by an enclosure 312 to form a connector assembly structure to receive the connector of the electrical energy source. The housing 302 is made of electrically insulating material, particularly, plastic composites. The housing 302 may include apertures to protrude the first terminal 220 and the second terminal 222 from the housing 302. The housing 302 may receive a cover 308 to close a top side of the housing 302. The second terminal 222 is connected to a wire 310 or any other conducting element to provide electrical energy to the heater device 200. Further, the heater device 200 include a frame 312 to receive the plurality of heater elements 202 to provide rigid support to the plurality of heating elements 202. As the bus-bar assembly 200A having the both first set of connecting legs 208 and the second set of connecting legs 210 in single side, length of power loop is reduced, thereby the thermal efficiency of the heater device 200 is enhanced. Further, size of the PCB 218 can be reduced as the first set of connecting legs 208 and the second set of connecting legs 210 provided in the same side of the PCB 218. The heat device 200 can be a PTC coil. As the first terminal 220, and the second terminal 222 are in different sides of the bus-bar assembly 200A, electrical leakage between the first terminal 220, and the second terminal 222 is avoided.

Obviously, numerous modifications and variations of the present invention are possible in light of the above teachings. It is therefore to be understood that the invention may be practiced otherwise than as specifically described herein.

In any case, the invention cannot and should not be limited to the embodiments specifically described in this document, as other embodiments might exist. The invention shall spread to any equivalent means and any technically operating combination of means.

The invention claimed is:

1. A heater device for a vehicle, dedicated to be provided in a heating ventilation and air conditioning system (HVAC) to provide hot air to the vehicle's cabin, comprising:
a plurality of heating elements;
a bus bar assembly, comprising;
a first bus-bar having a first set of connecting legs formed in a first side of the first bus-bar, and
a second bus-bar having a coupling element formed in a first side of the second busbar with a first side of a printed circuit board received therein,
wherein a second set of connecting legs is formed adjacent to the coupling element and coupled directly to the first side of the printed circuit board, and
wherein one of the first set of connecting legs and second set of connecting legs is a positive set of connecting legs, and the other of the first set of connecting legs and second set of connecting legs is a negative set of connecting legs,
a control circuit provided on the printed circuit board and in-proximity to the coupling element and the second set of connecting legs for controlling the plurality of heating elements;
wherein the second bus-bar is connected to the second set of connecting legs through the control circuit for controlling the plurality of heating elements.

2. The heater device as claimed in claim 1, wherein the heater device further comprises a housing that is adapted to encapsulate the printed circuit board, the first bus-bar, and the second bus-bar.

3. The heater device as claimed in claim 1, wherein the control circuit comprises a switching element to power-on and power-off the plurality of heating elements.

4. The heater device as claimed in claim 1, wherein the second bus-bar is spaced apart from and superposed to the first bus-bar.

5. The heater device as claimed to claim 1, further comprising: a first terminal provided in a second side of the first bus-bar and a second terminal provided in a side perpendicular to the first side of the second bus-bar for providing electrical energy to the plurality of heating elements.

6. A bus-bar assembly for a heater device, comprising:
a first bus-bar having a first set of connecting legs formed in a first side of the first bus-bar, and
a second bus-bar having a coupling element formed in a first side of the second bus-bar to coupled with a first side of a printed circuit board received therein,
wherein a second set of connecting legs is formed adjacent to the coupling element and coupled directly to the first side of the printed circuit board, and
wherein one of the first set of connecting legs and second set of connecting legs is a positive set of connecting legs, and the other of the first set of connecting legs and second set of connecting legs is a negative set of connecting legs.

7. The bus-bar assembly as claimed in claim 6, further comprising: a control circuit provided on the printed circuit board and in-proximity to the coupling element and the second set of connecting legs for controlling heating elements of the heater device.

8. The bus-bar assembly as claimed in claim 7, wherein the second bus-bar is connected to the second set of connecting legs through the control circuit for controlling the heating elements.

9. The bus-bar assembly as claimed in claim 6, wherein the second bus-bar is spaced apart from and superposed to the first bus-bar.

\* \* \* \* \*